(12) United States Patent
Keller

(10) Patent No.: US 6,629,457 B1
(45) Date of Patent: Oct. 7, 2003

(54) DEVICE FOR MEASURING A FILL LEVEL OF A LIQUID IN A CONTAINER

(75) Inventor: Dieter Keller, Aschaffenburg (DE)

(73) Assignee: Mannesmann VDO AG, Frankfurt am Main (DE)

( * ) Notice: Subject to any disclaimer, the term of this patent is extended or adjusted under 35 U.S.C. 154(b) by 37 days.

(21) Appl. No.: 09/654,648

(22) Filed: Sep. 5, 2000

(30) Foreign Application Priority Data

Sep. 4, 1999 (DE) .......................................... 199 42 378

(51) Int. Cl.[7] .............................................. G01F 23/00
(52) U.S. Cl. .................... 73/290 V; 73/304 C; 367/908
(58) Field of Search .................. 73/304 C, 290 V, 73/290; 367/99, 908

(56) References Cited

U.S. PATENT DOCUMENTS

| 4,142,414 A | 3/1979 | Cosentino ..................... 73/216 |
| 4,531,406 A | 7/1985 | Fritz ............................ 73/290 |
| 5,119,676 A | 6/1992 | Bower et al. .................. 73/290 |

FOREIGN PATENT DOCUMENTS

| DE | 32 41 033 | 5/1984 | |
| DE | 37 24 411 | 2/1989 | ........... G01F/23/28 |
| DE | 40 25 326 | 11/1991 | |
| DE | 42 40 690 | 9/1993 | ........... H04R/23/00 |
| DE | 43 07 635 | 9/1993 | ........... G01F/23/28 |
| DE | 44 19 462 | 12/1995 | ........... G01F/23/28 |
| DE | 299 12 072 | 11/1999 | |
| FR | 1.219.895 | 5/1960 | |
| FR | 2 509 045 | 1/1983 | |

*Primary Examiner*—Helen Kwok
*Assistant Examiner*—André K. Jackson
(74) *Attorney, Agent, or Firm*—Cohen, Pontani, Lieberman & Pavane

(57) ABSTRACT

A device for measuring a fill level of liquid in a container includes a measuring tube arranged inside the container and an ultrasonic sensor arranged outside the container such that a portion of the wall of the container is arranged between the measuring tube and the ultrasonic sensor. The ultrasonic sensor therefore has no contact with the liquid located in the container.

13 Claims, 1 Drawing Sheet

DEVICE FOR MEASURING A FILL LEVEL OF A LIQUID IN A CONTAINER

BACKGROUND OF THE INVENTION

1. Field of the Invention

The present invention relates to a device for measuring a fill level of a liquid in a container, more specifically in a fuel tank of a motor vehicle. The device comprises a measuring tube with compensating openings and an ultrasonic sensor arranged proximate an end of the measuring tube for generating ultrasonic waves in the measuring tube and for receiving reflections of the ultrasonic waves reflected in the region of the liquid level in the container.

2. Description of the Related Art

Devices for measuring the fill level of fuel in a fuel tank using ultrasonic sensors are known in which an ultrasonic sensor has an outside diameter corresponding to the inside diameter of a measuring tube arranged in the fuel tank. The ultrasonic sensor is plugged into an end of the measuring tube. The measuring tube penetrates the bottom of the container and is filled with the liquid present in the fuel tank via compensating bores. To amplify the ultrasonic waves reflected by the liquid level, a float for reflecting the ultrasonic waves is arranged in the measuring tube. The sides of the measuring tube shield the ultrasonic sensor from lateral reflections which could degrade the measurement results.

A disadvantage of the known device that the ultrasonic sensor contacts the liquid in the container and the container must be sealed in a complicated fashion. Accordingly, the ultrasonic sensor for measuring a fill level in a fuel tank requires a very complicated and expensive encapsulation.

One solution to avoid sealing the bottom of the container in the area of the sensor includes a device in which the measuring tube with the ultrasonic sensor is arranged on a cover lid of the container and dips into the liquid. However, containers such as fuel tanks produced from plastic for motor vehicles, in particular, can swell and become deformed as a function of the fill level of the fuel. The deformation may raise or lower the bottom of the container and produce erroneous measurements of the fill level.

SUMMARY OF THE INVENTION

An object of the present invention is to provide a device for measuring the fill level of a container via reflections of an ultrasonic wave detected by a sensor such that it detects the fill level with particular reliability and requires no complicated sealing of the ultrasonic sensor or of the container.

The object of the present invention is met by a container having a measuring tube arranged therein such that a subregion of a container wall of the container is arranged between the measuring tube and an ultrasonic sensor.

This configuration reliably protects the ultrasonic sensor against contact with the liquid located in the container. Accordingly, the ultrasonic sensor cannot be attacked by the liquid located in the container. Furthermore, sealing in the wall of the container is not required because the wall of the container is not penetrated by the measuring tube. The device according to the present invention allows a particularly reliable measurement of the filling level in the container. Furthermore, the device according to the present invention comprises a simple design that can be produced very cost-effectively. Of course, a float may optionally be arranged in the measuring tube as is known.

The design of the device according to the present invention may be simplified by assembling the ultrasonic sensor and an evaluation unit for the signals of the ultrasonic sensor as one structural unit. In addition, the configuration as one structural unit simplifies mounting of the device on the container.

The measuring tube is preferably arranged vertically in the container. However, the measuring tube may alternatively be arranged at a slant in the container. In addition, the ultrasonic sensor could optionally be arranged on the top side of the container for determining the fill level of the liquid in the container by comparison of the ultrasonic waves reflected by the bottom and the ultrasonic waves reflected by the liquid level. However, the device according to the present invention requires only a particularly cost-effective and simply designed evaluation unit when the ultrasonic sensor bears directly against the subregion of the wall of the container constructed as a bottom of the wall of the container.

In accordance with another advantageous embodiment of the present invention, the ultrasonic sensor is securely fastened on the container and exhibits reliable transmission of sound onto the wall of the container when the ultrasonic sensor is permanently bonded to the wall of the container.

In accordance with another advantageous embodiment of the present invention, the ultrasonic sensor and the evaluation unit are protected against soiling and damage by a housing for holding the ultrasonic sensor and/or the evaluation unit of the ultrasonic sensor. This configuration extends the life of the ultrasonic sensor and of the evaluation unit when they are provided for a fuel tank mounted under a motor vehicle body.

In accordance with another advantageous embodiment of the present invention, the housing of the ultrasonic sensor is filled with a contact means which is a good conductor of ultrasonic waves for further improving the introduction of the sound into the wall of the container.

The measuring tube may, for example, be produced from metal. However, in accordance with another advantageous embodiment of the invention the measuring tube may be produced from plastic via injection molding with virtually any desired cross section. Accordingly, the shape of the measuring tube may, for example, be round, oval, or polygonal in accordance with the dimensions of an ultrasonic sensor and of an ultrasonic receiver of the ultrasonic sensor. The device according to the present invention may thereby be produced in a particularly cost-effective way.

A further reduction in the production costs of the device according to the present invention may be effected by producing the measuring tube as one piece with the container. If the container is produced from plastic via injection molding, the production of the measuring tube as one piece with the contianer requires no additional production steps.

In accordance with another advantageous embodiment of the present invention, support elements are arranged in the container for laterally supporting the measuring tube so that the measuring tube may be arranged easily in containers of virtually any desired shape.

One end of the measuring tube may be connected permanently to the container. However, the second end of the measuring tube may vibrate freely which produces a foaming in the region of the fill level of the liquid. This foaming produces inaccuracies in the measurement of the fill level. In accordance with another advantageous embodiment of the present invention, the measuring tube is reliably protected against vibrations when the measuring tube is held by two mutually opposite walls of the container.

In accordance with another advantageous embodiment of the present invention, the measuring tube forms a structural unit with a component that is to be arranged in the container so that the measuring tube may be mounted with particular ease.

When the container comprises a fuel tank for a motor vehicle, the lower end of the measuring tube is located end near the deepest point when the measuring tube is arranged on a splash pot or a suction jet pump of the fuel tank. The splash pot may be prestressed against the bottom of the fuel tank or may be produced in one piece with the tank so that the filling level in the fuel tank may be detected particularly reliably.

The production costs may be minimized and the mounting of the device simplified when the measuring tube is produced in one piece with the splash pot or a holder for the splash pot.

Fuel tanks of present-day motor vehicles are frequently constructed as saddle tanks or other types of multichamber tanks. In these configurations, the reliable determination of the fill level of the liquid is particularly easily obtained when the container has a plurality of ultrasonic sensors bearing against the outside of the container such that one ultrasonic sensor is associated with each of the chambers of the tank.

When the container is virtually full, a float facilitates operation by amplifying the ultrasonic signals reflected by the liquid level. However, when the container is near empty, the float falsifies the fill level determined. Therefore, a further embodiment of the present invention comprises a stop arranged in the measuring tube for bounding the float below a range of movement so that the fill level may be determined equally reliably when the container is fill and when the container is empty. Furthermore, a reserve fill level may be fixed very easily by the height of the stop. If the fill level in the container is below the stop for the float, the ultrasonic sensor receives two reflections irrespective of the type and temperature of the fuel. The fill level of the virtually empty fuel tank can be determined particularly accurately by comparing the two reflections.

In accordance with another embodiment of the present invention, compensating openings having a damping element for damping the pressure compensation are arranged at at least one end of the tube for preventing foaming in the measuring tube. Furthermore, fluctuations in the liquid column in the measuring tube are reliably damped thereby.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawing, wherein like reference characters denote similar elements throughout the several views.

DETAILED DESCRIPTION OF THE PRESENTLY PREFERRED EMBODIMENTS

Figure 1:
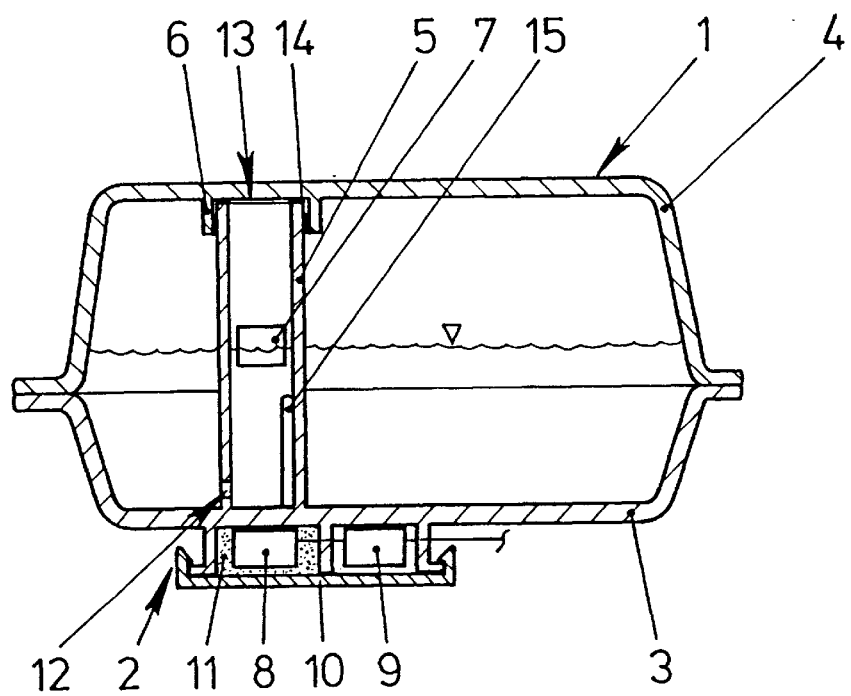
FIG. 1 is a longitudinal sectional view of a container with a device according to the present invention for determining a fill level of liquid in the container.

FIG. 1 shows a container 1 with a device 2 for measuring the fill level of liquid in the container 1. The container 1 may, for example, comprise a fuel tank for a motor vehicle and has first and second shell parts 3, 4, i.e., walls, produced from plastic via injection molding and welded to one another. The first shell part 3 is produced in one piece with a measuring tube 5 and the second shell part 4 has support elements 6 for laterally holding the free end of the measuring tube 5. A float 7 is arranged in the measuring tube 5. An ultrasonic sensor 8 and an evaluation unit 9 are arranged on the outside of the container 1 directly below the measuring tube 5 so that a portion of the first shell part 3 is arranged between the measuring tube 5 and the ultrasonic sensor 8. The container 1 has a housing 10 for holding the ultrasonic sensor 8 and the evaluation unit 9. The housing 10 is filled with a contact means 11 in the region of the ultrasonic sensor 8. The contact means 11 is a good conductor of ultrasonic waves. The measuring tube 5 has compensating openings 12, 13 arranged at each free end proximate the bottom region of the container 1 through which air or fuel freely flow into the measuring tube 5 and pressure compensation and equalization occurs with the remaining part of the container 1. Accordingly, the fill level of the fuel in the measuring tube 5 corresponds to that of the remaining part of the container 1. The upper compensating opening 13 comprises a damping element 14 to prevent drastic fluctuations in the fuel level in the measuring tube 5. Furthermore, the range of movement of the float 7 is limited by a stop 15 arranged in the measuring tube 5.

The ultrasonic sensor 8 transmits ultrasonic signals into the measuring tube 5. When the fill level rises above the stop 15, the ultrasonic signals are reflected by the float 7. When the fill level is below the stop 15, the ultrasonic signals are reflected by the fuel level. The float 7 amplifies the reflections of the ultrasonic waves. However, the amplification is not required when the fill level of liquid in the container 1 is low. The reflections of the ultrasonic signals are received by the ultrasonic sensor 8 and transmitted to the evaluation unit 9. The evaluation unit 9 determines the fill level of the fuel in the tank 1 from the echo time of the ultrasonic waves, i.e., the time between generation of the ultrasonic signal and receiving the reflection of the ultrasonic signal. The volume of fuel located in the tank 1 may subsequently be determined from the fill level. When the fill level drops below the stop 15, the ultrasonic sensor 8 receives a reflection from the float 7 bearing against the stop 15 in addition to the reflection from the fuel level. This second reflection may be used to indicate a reserve fill level.

Figure 2:
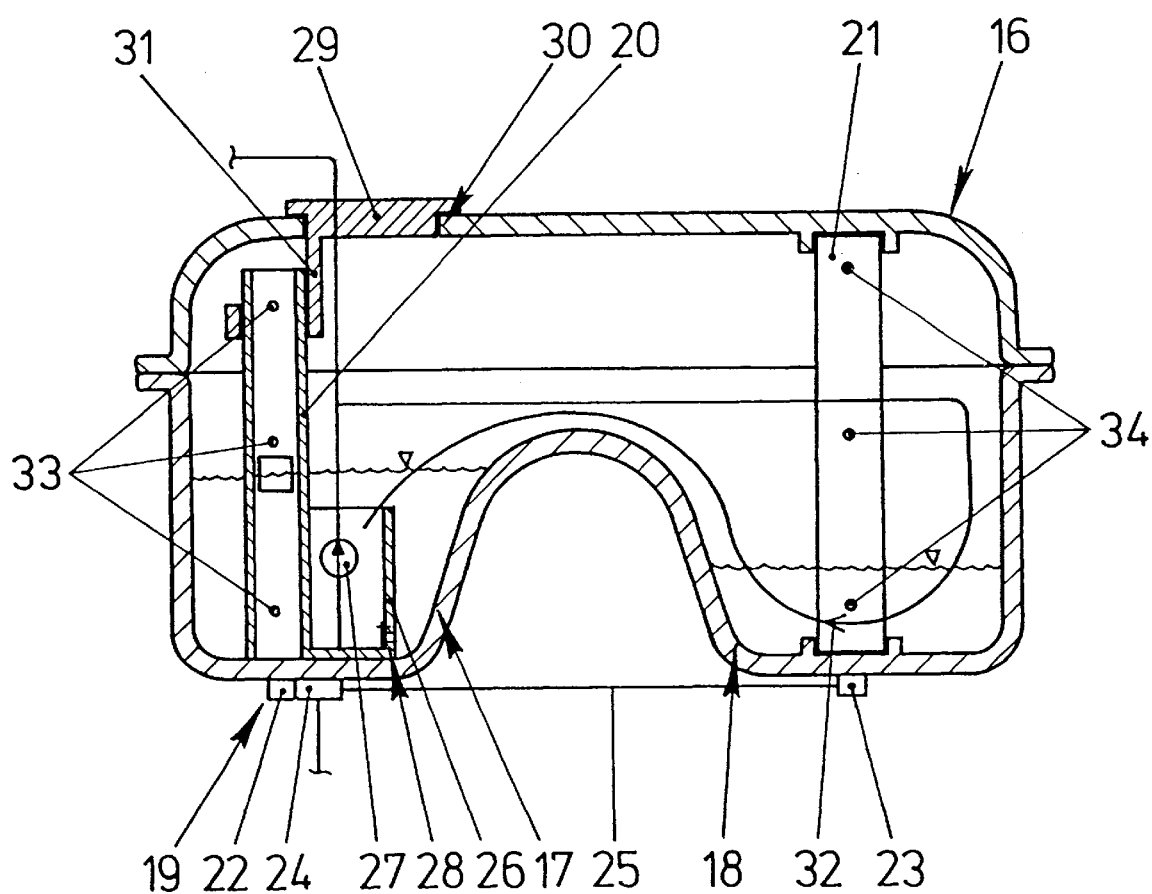
FIG. 2 is a longitudinal sectional view of a container constructed as a saddle tank and having a further embodiment of a device according to the present invention for determining the fill level of liquid in the container.

FIG. 2 shows a container 16, constructed as a saddle tank, with first and second chambers 17, 18 and with a device 19 for measuring the fill level in each of the first and second chambers 17, 18. The device 19 has first and second measuring tubes 20, 21 arranged respectively in the first and second chambers 17, 18. First and second ultrasonic sensors 22, 23 are respectively arranged on the outside of the tank 16 directly below the first and second measuring tubes 20, 21. The first ultrasonic sensor 22 forms a structural unit with an evaluation unit 24 and the second ultrasonic sensor 23 is connected to the evaluation unit 24 via a line 25. The first and second ultrasonic sensors 22, 23 and the evaluation unit 24 determine the filling level in each of the first and second chambers 17, 18 similarly to the ultrasonic sensor 8 and evaluation unit 9 of FIG. 1, by determining the echo time between emission of the ultrasonic signal and receiving of the reflected ultrasonic signal. The first measuring tube 20 is produced in one piece with a splash pot 26 which contains a delivery unit 27 arranged therein. The splash pot 26 is located at the deepest point of the tank 16 and has a bottom valve 28 through which fuel may pass exclusively into the splash pot 26. The container 16 has an opening 30 which is closed by a cover 29. The opening 30 is arranged above the splash pot 26 and serves as a mounting opening for the splash pot 26. A holder 31 is arranged on the cover 29 which holds the first measuring tube 20 in a vertically displaceable fashion and prestresses the first measuring tube 20 together with the splash pot 26 against the bottom of the container 16. The second measuring tube 21 is clamped in the tank 16 and holds a suction jet pump 32. Liquid such as, for example, fuel is supplied to the suction jet pump 32 via the delivery unit 27 and the suction jet pump 32 delivers the fuel into the splash pot 26. The first and second measuring tubes 20, 21 respectively have a plurality of compensating openings 33, 34 for pressure compensation and equalization with the remaining part of the tank 16.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A device for measuring a fill level of a liquid in a container, comprising:
   a measuring tube arranged in the container, said measuring tube comprising compensating openings operatively arranged for allowing an equalization of pressure and fill level between the measuring tube and the container;
   an ultrasonic sensor arranged proximate an end of said measuring tube and operatively arranged for generating an ultrasonic signal and receiving reflections of the ultrasonic signal reflected in the region of the fill level of the liquid in the container, wherein said ultrasonic sensor is arranged on said container such that a portion of a container wall of the container is arranged between said end of said measuring tube and said ultrasonic sensor; and
   an evaluation unit operatively connected to said ultrasonic sensor for determining the fill level from the signals of the ultrasonic sensor, wherein said evaluation unit and said ultrasonic sensor are arranged as a structural unit and said structural unit is arranged directly on said portion of a container wall.

2. The device of claim 1, wherein said measuring tube is produced from plastic via injection molding.

3. A device for measuring a fill level of a liquid in a container, comprising:
   a measuring tube arranged in the container, said measuring tube comprising compensating openings operatively arranged for allowing an equalization of pressure and fill level between the measuring tube and the container;
   an ultrasonic sensor arranged proximate an end of said measuring tube and operatively arranged for generating an ultrasonic signal and receiving reflections of the ultrasonic signal reflected in the region of the fill level of the liquid in the container, wherein said ultrasonic sensor is arranged on said container such that a portion of a container wall of the container is arranged between said end of said measuring tube and said ultrasonic sensor; and
   a housing arranged for holding said ultrasonic sensor onto the container.

4. A device for measuring a fill level of a liquid in a container, comprising:
   a measuring tube arranged in the container, said measuring tube comprising compensating openings operatively arranged for allowing an equalization of pressure and fill level between the measuring tube and the container;
   an ultrasonic sensor arranged proximate an end of said measuring tube and operatively arranged for generating an ultrasonic signal and receiving reflections of the ultrasonic signal reflected in the region of the fill level of the liquid in the container, wherein said ultrasonic sensor is arranged on said container such that a portion of a container wall of the container is arranged between said end of said measuring tube and said ultrasonic sensor;
   a housing arranged for holding said ultrasonic sensor onto the container; and
   a contact means arranged in said housing for filling spaces between said ultrasonic sensor and said housing, wherein said contact means is a conductor of ultrasonic waves.

5. A device for measuring a fill level of a liquid in a container, comprising:
   a measuring tube arranged in the container, said measuring tube comprising compensating openings operatively arranged for allowing an equalization of pressure and fill level between the measuring tube and the container;
   an ultrasonic sensor arranged proximate an end of said measuring tube and operatively arranged for generating an ultrasonic signal and receiving reflections of the ultrasonic signal reflected in the region of the fill level of the liquid in the container, wherein said ultrasonic sensor is arranged on said container such that a portion of a container wall of the container is arranged between said end of said measuring tube and said ultrasonic sensor;
   an evaluation unit operatively connected to said ultrasonic sensor for determining the fill level from the signals of the ultrasonic sensor, wherein said evaluation unit and said ultrasonic sensor are arranged as a structural unit; and
   a housing arranged for holding said ultrasonic sensor and said evaluation unit onto the container.

6. The device of claim 5, further comprising a contact means arranged in said housing for filling spaces between said ultrasonic sensor and said housing, wherein said contact means is a conductor of ultrasonic waves.

7. The device for measuring a fill level of a liquid in a container, comprising:
- a measuring tube arranged in the container, said measuring tube having a proximal end and a distal end and comprising compensating openings operatively arranged for allowing an equalization of pressure and fill level between the measuring tube and the container;
- an ultrasonic sensor arranged proximate said proximal end of said measuring tube and operatively arranged for generating an ultrasonic signal and receiving reflections of the ultrasonic signal reflected in the region of the fill level of the liquid in the container, wherein said ultrasonic sensor is arranged on said container such that a portion of a container wall of the container is arranged between said proximal end of said measuring tube and said ultrasonic sensor, wherein said portion of said container wall comprises a bottom of a container and said ultrasonic sensor bears directly against said portion of said container wall; and
- support elements arranged in the container for laterally supporting said distal end of said measuring tube.

8. A device for measuring a fill level of a liquid in a container, comprising:
- a measuring tube arranged in the container, said measuring tube comprising compensating openings operatively arranged for allowing an equalization of pressure and fill level between the measuring tube and the container;
- an ultrasonic sensor arranged proximate an end of said measuring tube and operatively arranged for generating an ultrasonic signal and receiving reflections of the ultrasonic signal reflected in the region of the fill level of the liquid in the container, wherein said ultrasonic sensor is arranged on said container such that a portion of a container wall of the container is arranged between said end of said measuring tube and said ultrasonic sensor; and
- a component arranged in the container, wherein said measuring tube forms a structural unit with said component.

9. The device of claim 8, wherein the container comprises a fuel tank and said component to be arranged in the container comprises one of a splash pot and a suction jet pump.

10. The device of claim 8, wherein the container comprises a fuel tank and said component to be arranged in the container comprises one of a splash pot and a holder for the splash pot.

11. A device for measuring a fill level of a liquid in a container, comprising:
- a measuring tube arranged in the container, said measuring tube comprising compensating openings operatively arranged for allowing an equalization of pressure and fill level between the measuring tube and the container; and
- an ultrasonic sensor arranged proximate an end of said measuring tube and operatively arranged for generating an ultrasonic signal and receiving reflections of the ultrasonic signal reflected in the region of the fill level of the liquid in the container, wherein said ultrasonic sensor is arranged on said container such that a portion of a container wall of the container is arranged between said end of said measuring tube and said ultrasonic sensor, wherein the container comprises a multichamber tank and said device comprises a plurality of ultrasonic sensors bearing against the outside of the container, each of said plural ultrasonic sensors corresponding to one of the chambers in the multichamber tank.

12. A device for measuring a fill level of a liquid in a container, comprising:
- a measuring tube arranged in the container, said measuring tube comprising compensating openings operatively arranged for allowing an equalization of pressure and fill level between the measuring tube and the container;
- an ultrasonic sensor arranged proximate an end of said measuring tube and operatively arranged for generating an ultrasonic signal and receiving reflections of the ultrasonic signal reflected in the region of the fill level of the liquid in the container, wherein said ultrasonic sensor is arranged on said container such that a portion of a container wall of the container is arranged between said end of said measuring tube and said ultrasonic sensor; and
- a float arranged in said measuring tube for following the fill level of the liquid in the container, and wherein said measuring tube comprises a stop for bounding the float below a range of movement such that said ultrasonic sensor receiving two reflections when said fill level is below said stop.

13. A device for measuring a fill level of a liquid in a container, comprising:
- a measuring tube arranged in the container, said measuring tube comprising compensating openings operatively arranged for allowing an equalization of pressure and fill level between the measuring tube and the container;
- an ultrasonic sensor arranged proximate an end of said measuring tube and operatively arranged for generating an ultrasonic signal and receiving reflections of the ultrasonic signal reflected in the region of the fill level of the liquid in the container, wherein said ultrasonic sensor is arranged on said container such that a portion of a container wall of the container is arranged between said end of said measuring tube and said ultrasonic sensor; and
- a damping element arranged in at least one of said compensating openings of said measuring tube for damping the pressure compensation.

* * * * *

UNITED STATES PATENT AND TRADEMARK OFFICE
CERTIFICATE OF CORRECTION

PATENT NO. : 6,629,457 B1
DATED : October 7, 2003
INVENTOR(S) : Dieter Keller

It is certified that error appears in the above-identified patent and that said Letters Patent is hereby corrected as shown below:

<u>Title page,</u>
Item [*] Notice, should read as follows:
-- [*] Notice:   Subject to any disclaimer, the term of this patent is extended or adjusted under 35 U.S.C. 154(b) by 85 days. --.

Signed and Sealed this

Tenth Day of February, 2004

JON W. DUDAS
*Acting Director of the United States Patent and Trademark Office*